United States Patent
Gotou et al.

(10) Patent No.: US 11,738,998 B2
(45) Date of Patent: Aug. 29, 2023

(54) METHOD FOR PRODUCING LITHIUM DIFLUOROPHOSPHATE

(71) Applicant: Mitsui Chemicals, Inc., Tokyo (JP)

(72) Inventors: Kenichi Gotou, Chiba (JP); Makoto Suzuki, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 997 days.

(21) Appl. No.: 16/482,027

(22) PCT Filed: Jan. 25, 2018

(86) PCT No.: PCT/JP2018/002353
§ 371 (c)(1),
(2) Date: Jul. 30, 2019

(87) PCT Pub. No.: WO2018/143057
PCT Pub. Date: Aug. 9, 2018

(65) Prior Publication Data
US 2019/0389726 A1 Dec. 26, 2019

(30) Foreign Application Priority Data

Jan. 31, 2017 (JP) .................... 2017-015855
Jan. 31, 2017 (JP) .................... 2017-015856

(51) Int. Cl.
*C01B 25/12* (2006.01)
*B01D 11/02* (2006.01)
*C01B 25/163* (2006.01)
*C01D 15/00* (2006.01)

(52) U.S. Cl.
CPC .............. *C01B 25/12* (2013.01); *B01D 11/02* (2013.01); *C01B 25/163* (2013.01); *C01D 15/005* (2013.01)

(58) Field of Classification Search
CPC ....... C01B 25/12; C01B 25/163; B01D 11/02; C01D 15/005
USPC ....................................................... 423/301
See application file for complete search history.

(56) References Cited

U.S. PATENT DOCUMENTS

| | | | |
|---|---|---|---|
| 8,889,091 B2 * | 11/2014 | Schulz | H01M 10/052 423/301 |
| 2011/0111288 A1 | 5/2011 | Nishida et al. | |
| 2015/0263384 A1 * | 9/2015 | Boll | C01D 15/04 423/301 |
| 2017/0334723 A1 | 11/2017 | Nakahara et al. | |

FOREIGN PATENT DOCUMENTS

| | | |
|---|---|---|
| CN | 105236368 A | 1/2016 |
| JP | 3439085 B2 | 8/2003 |
| JP | 4604505 B2 | 1/2011 |
| JP | 5768801 B2 | 8/2015 |
| JP | 2015209341 A * | 11/2015 |
| JP | 2015209341 A | 11/2015 |
| JP | 2016-108197 A | 6/2016 |

OTHER PUBLICATIONS

The extended European Search Report dated Jun. 8, 2020, by the European Patent Office in corresponding European Patent Application No. 18747810.2. (8 pages).
International Search Report (PCT/ISA/210) and translation and Written Opinion (PCT/ISA/237) dated Apr. 10, 2018, by the Japanese Patent Office as the International Searching Authority for International Application No. PCT/JP2018/002353.

* cited by examiner

*Primary Examiner* — James E McDonough
(74) *Attorney, Agent, or Firm* — BUCHANAN INGERSOLL & ROONEY PC

(57) ABSTRACT

A method of producing lithium difluorophosphate, the method including: a step of obtaining a first raw material mixture by mixing lithium hexafluorophosphate, at least one selected from the group consisting of an oxide of phosphorus (A) and a lithium salt of a phosphoric acid (B), and a hydrocarbon solvent having from 6 to 12 carbon atoms; a step of obtaining a second raw material mixture by removing at least a part of the hydrocarbon solvent contained in the obtained first raw material mixture; and a step of producing a crude product containing lithium difluorophosphate by reacting the second raw material mixture.

11 Claims, No Drawings

METHOD FOR PRODUCING LITHIUM DIFLUOROPHOSPHATE

TECHNICAL FIELD

The present disclosure relates to a method of producing lithium difluorophosphate.

BACKGROUND ART

In recent years, lithium secondary batteries are widely used as power supplies for electronic devices such as mobile phones and laptop computers, electric vehicles, or power storage. In particular, in recent years, the demand for high-capacity, high-power, high-energy density batteries that can be mounted on hybrid vehicles and electric vehicles is rapidly expanding.

The lithium secondary battery includes, for example, a positive electrode and a negative electrode containing a material capable of absorbing and desorbing lithium, and a non-aqueous electrolyte solution for a battery containing a lithium salt and a non-aqueous solvent.

As a positive electrode active material used for the positive electrode, for example, lithium metal oxides such as $LiCoO_2$, $LiMnO_2$, $LiNiO_2$ and $LiFePO_4$ are used.

As the negative electrode active material used for the negative electrode, for example, metallic lithium, metallic compounds capable of absorbing and desorbing lithium (metal alone, oxides, alloys with lithium, etc.) and carbon materials are known, and in particular, coke, artificial graphite and natural graphite are in practical use.

In addition, as a non-aqueous electrolyte solution for a battery, a solution obtained by mixing Li electrolyte such as $LiPF_6$, $LiBF_4$, $LiN(SO_2CF_3)_2$ or $LiN(SO_2CF_2CF_3)_2$ in a mixed solvent (non-aqueous solvent) of carbonates such as ethylene carbonate, propylene carbonate, dimethyl carbonate, and ethyl methyl carbonate is used.

In order to improve the performance of a battery (for example, a lithium secondary battery) using a non-aqueous electrolyte solution for a battery, various additives are contained in the non-aqueous electrolyte solution for a battery.

For example, as a non-aqueous electrolyte solution for a battery that can improve the storage characteristics of the battery, a non-aqueous electrolyte solution for a battery containing at least one of lithium monofluorophosphate or lithium difluorophosphate as an additive is known (for example, Patent Literature 1).

So far, various methods have been developed as the method of producing lithium difluorophosphate. For example, a method of reacting lithium hexafluorophosphate with silicon dioxide in a non-aqueous solvent (see, for example, Patent Literature 2), and a method of reacting lithium hexafluorophosphate with a compound having a Si—O—Si bond such as hexamethyldisiloxane (see, for example, Patent Literature 3) are disclosed.

Further, as a method of producing lithium difluorophosphate, a method of reacting lithium hexafluorophosphate with a phosphorus oxoacid salt of lithium and an oxo acid anhydride of phosphorus is disclosed (see, for example, Patent Literature 4).

Patent Literature 1: Japanese Patent No. 3439085
Patent Literature 2: Japanese Patent No. 4604505
Patent Literature 3: Japanese Patent No. 5768801
Patent Literature 4: Japanese Patent Application Laid-Open (JP-A) No. 2015-209341

SUMMARY OF INVENTION

Technical Problem

However, in the method of producing lithium difluorophosphate, it may be required to further increase the yield of lithium difluorophosphate.

Therefore, an object of the present disclosure is to provide a method of producing lithium difluorophosphate which can produce lithium difluorophosphate in a high yield.

Solution to Problem

Means for solving the above problem includes the following embodiments.

<1> A method of producing lithium difluorophosphate, the method comprising:

a step of obtaining a first raw material mixture by mixing lithium hexafluorophosphate, at least one selected from the group consisting of an oxide of phosphorus (A) and a lithium salt of a phosphoric acid (B), and a hydrocarbon solvent having from 6 to 12 carbon atoms;

a step of obtaining a second raw material mixture by removing at least a part of the hydrocarbon solvent contained in the obtained first raw material mixture; and a step of producing a crude product containing lithium difluorophosphate by reacting the second raw material mixture.

<2> The method of producing lithium difluorophosphate according to <1>, wherein the hydrocarbon solvent is at least one solvent selected from the group consisting of tetralin, toluene, hexane and cyclohexane.

<3> The method of producing lithium difluorophosphate according to <1> or <2>, wherein a content of the hydrocarbon solvent is 50% by mass or more with respect to an entirety of the first raw material mixture.

<4> The method of producing lithium difluorophosphate according to any one of <1> to <3>, wherein the step of producing the crude product is a step of producing the crude product by reacting lithium hexafluorophosphate with at least one selected from the group consisting of an oxide of phosphorus (A) and a lithium salt of a phosphoric acid (B) according to the following reaction formula:

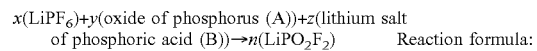

Reaction formula: $x(LiPF_6) + y(\text{oxide of phosphorus (A)}) + z(\text{lithium salt of phosphoric acid (B)}) \rightarrow n(LiPO_2F_2)$ wherein, in the reaction formula, x, y, z, and n represent stoichiometric coefficients, each of x and n independently represents an integer of 1 or more, and each of y and z independently represents an integer of 0 or 1 or more, provided that, x, y, z, and n satisfy the following formulae (1) to (4):

$$x + \text{number of Li atoms in (B)} \times z = n; \quad \text{Formula (1):}$$

$$x + \text{number of P atoms in (A)} \times y + \text{number of P atoms in (B)} \times z = n; \quad \text{Formula (2):}$$

$$\text{number of O atoms in (A)} \times y + \text{number of O atoms in (B)} \times z = 2n; \text{ and} \quad \text{Formula (3):}$$

$$6x = 2n. \quad \text{Formula (4):}$$

<5> The method of producing lithium difluorophosphate according to any one of <1> to <4>, wherein the step of producing the crude product is a step of producing the crude product by reacting lithium hexafluorophosphate with at least one selected from the group consisting of lithium metaphosphate, trilithium phosphate, tetralithium pyrophosphate, pentalithium triphosphate, hexalithium tetraphosphate, and diphosphorus pentoxide.

<6> The method of producing lithium difluorophosphate according to any one of <1> to <5>, wherein the step of producing the crude product is a step of producing the crude product by reacting lithium hexafluorophosphate with a compound containing one selected from the group consisting of trilithium phosphate, tetralithium pyrophosphate, pentalithium triphosphate, and hexalithium tetraphosphate, and diphosphorus pentoxide.

<7> The method of producing lithium difluorophosphate according to any one of <1> to <6>, wherein the step of producing the crude product is a step of producing the crude product by reacting lithium hexafluorophosphate with trilithium phosphate and diphosphorus pentoxide.

<8> The method of producing lithium difluorophosphate according to any one of <1> to <5>, wherein the step of producing the crude product is a step of producing the crude product by reacting lithium hexafluorophosphate with lithium metaphosphate.

<9> The method of producing lithium difluorophosphate according to any one of <1> to <8>, further comprising:
a step of obtaining a solution by dissolving the crude product in a purification solvent; and
a step of extracting lithium difluorophosphate from the solution.

<10> The method of producing lithium difluorophosphate according to <9>, wherein the purification solvent is a mixed solvent in which at least one solvent (X) selected from the group consisting of ethyl acetate, acetone, dimethoxyethane, diethylene glycol dimethyl ether, and triethylene glycol dimethyl ether, and at least one solvent (Y) selected from the group consisting of toluene, xylene, hexane, acetonitrile, dimethyl carbonate, ethyl methyl carbonate, and diethyl carbonate, are mixed at a mass ratio (the solvent (X)/the solvent (Y)) in a range from 70/30 to 95/5.

<11> The method of producing lithium difluorophosphate according to <10>, wherein the purification solvent is a mixed solvent containing at least one of ethyl acetate or dimethoxyethane as the solvent (X) and at least one of toluene or dimethyl carbonate as the solvent (Y).

<12> The method of producing lithium difluorophosphate according to <10> or <11>, wherein a combination of the solvent (X) and the solvent (Y) is a combination of ethyl acetate and toluene, a combination of ethyl acetate and dimethyl carbonate, a combination of dimethoxyethane and toluene, or a combination of dimethoxyethane and dimethyl carbonate.

Advantageous Effects of Invention

According to the present disclosure, a method of producing lithium difluorophosphate which can produce lithium difluorophosphate in a high yield is provided.

DESCRIPTION OF EMBODIMENTS

In the present specification, a numerical range represented using "to" means a range including numerical values described before and after "to" as the lower limit value and the upper limit value.

In the present specification, the term "step" encompasses not only an independent step but also a step that cannot be clearly distinguished from other steps if the intended purpose of the step is achieved.

[Method of Producing Lithium Difluorophosphate]

A method of producing lithium difluorophosphate of the present disclosure (hereinafter, also referred to as "the production method of the present disclosure") includes: a step of obtaining a first raw material mixture by mixing lithium hexafluorophosphate, at least one selected from the group consisting of an oxide of phosphorus (A) and a lithium salt of a phosphoric acid (B), and a hydrocarbon solvent having from 6 to 12 carbon atoms (hereinafter, also referred to as "specific hydrocarbon solvent"); a step of obtaining a second raw material mixture by removing at least a part of the hydrocarbon solvent contained in the obtained first raw material mixture; and a step of producing a crude product containing lithium difluorophosphate by reacting the second raw material mixture (hereinafter, also referred to as "reaction step").

Here, the specific hydrocarbon solvent, that is, the hydrocarbon solvent having from 6 to 12 carbon atoms is a medium for mixing $LiPF_6$, and at least one selected from the group consisting of an oxide of phosphorus (A) and a lithium salt of a phosphoric acid (B) (hereinafter, also referred to as "raw material mixed medium").

Hereinafter, lithium difluorophosphate is also referred to as "$LiPO_2F_2$" and lithium hexafluorophosphate is also referred to as "$LiPF_6$".

According to the production method of the present disclosure, $LiPO_2F_2$ can be produced in a high yield.

Although the reason why such an effect is exerted is not clear, it is considered to be because, in the step of obtaining the first raw material mixture, the raw materials are easily mixed uniformly by mixing $LiPF_6$ and at least one selected from the group consisting of an oxide of phosphorus (A) and a lithium salt of a phosphoric acid (B) (hereinafter, also referred to simply as "raw materials") using the specific hydrocarbon solvent, and as a result, the reaction in the reaction step proceeds efficiently.

In contrast, when a solvent having no hydrocarbon structure (for example, acetone, triethylene glycol dimethyl ether, or acetonitrile) is used instead of the specific hydrocarbon solvent, the reaction may be inhibited in the reaction step.

Therefore, it is considered that, according to the production method of the present disclosure, since the reaction proceeds efficiently, the yield of $LiPO_2F_2$ is improved.

Hereinafter, each step in the production method of the present disclosure will be described.

<Step of Obtaining First Raw Material Mixture>

The step of obtaining the first raw material mixture is a step of obtaining a first raw material mixture by mixing lithium hexafluorophosphate ($LiPF_6$), at least one selected from the group consisting of an oxide of phosphorus (A) and a lithium salt of a phosphoric acid (B), and a hydrocarbon solvent having from 6 to 12 carbon atoms.

A solid (for example, powder) produced by a conventionally known method can be use as $LiPF_6$.

Examples of an oxide of phosphorus (A) include diphosphorus pentoxide (hereinafter, also referred to as "$P_2O_5$"). $P_2O_5$ encompasses tetraphosphorus decoxide ($P_4O_{10}$) as the same compound.

Solids (for example, powder) produced by a conventionally known method can be used as $P_2O_5$.

Examples of a lithium salt of a phosphoric acid (B) include lithium metaphosphate (hereinafter also referred to as "$LiPO_3$"), trilithium phosphate (hereinafter also referred to as "$Li_3PO_4$"), tetralithium pyrophosphate (hereinafter also referred to as "$Li_4P_2O_7$"), pentalithium triphosphate (hereinafter also referred to as "$Li_5P_3O_{10}$"), and hexalithium tetraphosphate (hereinafter also referred to as "$Li_6P_4O_{13}$").

Solids (for example, powder) produced by a conventionally known method can be used as a lithium salt of a phosphoric acid (B).

From the viewpoint of reducing by-products, the purity of the raw material ($LiPF_6$, oxide of phosphorus (A), lithium salt of a phosphoric acid (B)) is preferably high, but is not particularly limited.

Examples of the hydrocarbon solvent having from 6 to 12 carbon atoms (specific hydrocarbon solvents) include aliphatic hydrocarbon solvents having from 6 to 12 carbon atoms, aromatic hydrocarbon solvents having from 6 to 12 carbon atoms, and alicyclic hydrocarbon solvents having from 6 to 12 carbon atoms.

Examples of the aliphatic hydrocarbon solvents having from 6 to 12 carbon atoms include hexane, heptane, octane, nonane, and decane. These may be linear or branched.

Examples of the aromatic hydrocarbon solvents having from 6 to 12 carbon atoms include benzene, toluene, xylene (ortho, meta and para), ethylbenzene, butylbenzene, pentylbenzene, hexylbenzene, heptylbenzene, propylbenzene, isopropylbenzene (cumene), cyclohexylbenzene, tetralin and mesitylene. The alkyl group of the above-described aromatic hydrocarbon solvents may be linear or branched.

Examples of the alicyclic hydrocarbon solvents having from 6 to 12 carbon atoms include methyl cyclopentane, cyclohexane, methyl cyclohexane, cycloheptane, cyclooctane, cyclononane and the like.

Among others, the specific hydrocarbon solvent is preferably at least one solvent selected from the group consisting of tetralin, toluene, hexane, and cyclohexane from the viewpoint of improving the yield of $LiPO_2F_2$.

The method of mixing the raw material ($LiPF_6$ and at least one selected from the group consisting of an oxide of phosphorus (A) and a lithium salt of a phosphoric acid (B)) with a specific hydrocarbon solvent is not particularly limited, and known methods can be used. Examples of the method include a method of mixing using a reactor equipped with a stirring mechanism such as a mechanical stirrer or a magnetic stirrer; a method of mixing using a mixer, a blender, a mill or the like; and method of mixing using a slurry mixer, a kneader, a mixing and kneading machine or the like.

The content of the specific hydrocarbon solvent contained in the first raw material mixture is preferably 50% by mass or more, more preferably 60% by mass or more, still more preferably 70% by mass or more, with respect to the entirety of the first raw material mixture.

<Step of Obtaining Second Raw Material Mixture>

The step of obtaining the second raw material mixture is a step of obtaining the second raw material mixture by removing at least a part of the specific hydrocarbon solvent contained in the obtained first raw material mixture.

Examples of the method of removing at least a part of the specific hydrocarbon solvent contained in the first raw material mixture include, without specific limitation, a method of heating and concentrating the first raw material mixture and distilling off the specific hydrocarbon solvent; a method of concentrating the first raw material mixture under reduced pressure with an evaporator and distilling off the specific hydrocarbon solvent; a method of filtering the first raw material mixture (for example, filter filtration, filtration under reduced pressure, suction filtration); and the like.

The step of obtaining the second raw material mixture is preferably a step of obtaining the second raw material mixture in the form of a wet cake from the viewpoint of further enhancing the reactivity in the reaction step described later.

In other words, in the step of obtaining the second raw material mixture, the specific hydrocarbon solvent contained in the first raw material mixture is preferably removed to such an extent that the second raw material mixture in a form of a wet cake can be obtained.

<Reaction Step>

In the production method of the present disclosure, the reaction step is a step of producing a crude product containing lithium difluorophosphate ($LiPO_2F_2$) by reacting the second raw material mixture.

Here, "reacting the second raw material mixture" refers to reacting lithium hexafluorophosphate ($LiPF_6$) in the second raw material mixture with at least one selected from the group consisting of an oxide of phosphorus (A) and a lithium salt of a phosphoric acid (B) in the second raw material mixture.

In the production method of the present disclosure, it is preferable that the reaction step is a step of producing the crude product by reacting lithium hexafluorophosphate (that is, lithium hexafluorophosphate in the second raw material mixture) with at least one selected from the group consisting of an oxide of phosphorus (A) and a lithium salt of a phosphoric acid (B) (that is, at least one selected from the group consisting of an oxide of phosphorus (A) and a lithium salt of a phosphoric acid (B) in the second raw material mixture) according to the reaction formula given below.

Reaction formula:
$$x(LiPF_6) + y(\text{oxide of phosphorus (A)}) + z(\text{lithium salt of phosphoric acid (B)}) \rightarrow n(LiPO_2F_2)$$

In the above reaction formula, x, y, z, and n represent stoichiometric coefficients, each of x and n independently represents an integer of 1 or more, and each of y and z independently represents an integer of 0 or 1 or more, provided that, x, y, z, and n satisfy the following formulae (1) to (4).

Formula (1): $x + \text{number of Li atoms in the (B)} \times z = n$

Formula (2): $x + \text{number of P atoms in the (A)} \times y + \text{number of P atoms in the (B)} \times z = n$ Formula (3): $\text{number of O atoms in the (A)} \times y + \text{number of O atoms in the (B)} \times z = 2n$ Formula (4): $6x = 2n$ When the reaction step follows the above-described reaction formula, it is easy to obtain a crude product in which products (that is, by-products) other than the main product $LiPO_2F_2$ is further reduced in the above-described reaction. In addition, waste of raw materials is also reduced.

In the reaction according to the above-described reaction formula, fluctuation of the molar number (stoichiometric coefficient) of the raw material can be tolerated according to the purity of the raw material.

Further, in the above-described reaction, it is possible to allow fluctuation of the raw material molar ratio due to measurement error of the purity of the raw material and weighing error in the range where the effects of the present disclosure are exhibited.

In the production method of the present disclosure, it is also preferable that the reaction step is a step of producing the crude product by reacting lithium hexafluorophosphate ($LiPF_6$) with at least one selected from the group consisting of lithium metaphosphate ($LiPO_3$), trilithium phosphate ($Li_3PO_4$), tetralithium pyrophosphate ($Li_4P_2O_7$), pentalithium triphosphate ($Li_5P_3O_{10}$), hexalithium tetraphosphate ($Li_6P_4O_{13}$), and diphosphorus pentoxide ($P_2O_5$).

When the reaction step is this embodiment, "at least one selected from the group consisting of an oxide of phosphorus (A) and a lithium salt of a phosphoric acid (B)" in the step of obtaining the first raw material mixture preferably includes at least one selected from the group consisting of $LiPO_3$, $Li_3PO_4$, $Li_4P_2O_7$, $Li_5P_3O_{10}$, $Li_6P_4O_{13}$, and $P_2O_5$.

When the reaction step is the above-described embodiment, the above reaction formula may not be satisfied, but it is more preferable to be satisfied.

Here, $P_2O_5$ corresponds to the oxide of phosphorus (A), and $LiPO_3$, $Li_3PO_4$, $Li_4P_2O_7$, $Li_5P_3O_{10}$ and $Li_6P_4O_{13}$ correspond to a lithium salt of a phosphoric acid (B).

Examples of the modes of the above-described reaction include the following three modes. In modes 1 and 2, a lithium salt of a phosphoric acid (B) other than $LiPO_3$ may be used singly or in combination of two or more.

(Mode 1): Reaction of $LiPF_6$, $P_2O_5$, and a lithium salt of a phosphoric acid (B) other than $LiPO_3$ (Mode 2): Reaction of $LiPF_6$, $P_2O_5$, $LiPO_3$, and a lithium salt of a phosphoric acid (B) other than $LiPO_3$.

(Mode 3): Reaction of $LiPF_6$ with $LiPO_3$

The reaction step is more preferably the following reaction step A or reaction step B.

(Reaction Step A)

The reaction step A is a step of producing the crude product through the reaction of the above-described mode 1 or 2.

In other words, the reaction step A is a step of producing the crude product by reacting lithium hexafluorophosphate ($LiPF_6$) with a compound containing one selected from the group consisting of trilithium phosphate ($Li_3PO_4$), tetralithium pyrophosphate ($Li_4P_2O_7$), pentalithium triphosphate ($Li_5P_3O_{10}$), and hexalithium tetraphosphate ($Li_6P_4O_{13}$), and diphosphorus pentoxide ($P_2O_5$).

Among others, the reaction step A is preferably a step of producing the crude product by reacting lithium hexafluorophosphate ($LiPF_6$) with trilithium phosphate ($Li_3PO_4$) and diphosphorus pentoxide ($P_2O_5$).

When the reaction step in the production method of the present disclosure is the reaction step A, "at least one selected from the group consisting of an oxide of phosphorus (A) and a lithium salt of a phosphoric acid (B)" in the step of obtaining the first raw material mixture preferably includes at least one selected from the group consisting of $Li_3PO_4$, $Li_4P_2O_7$, $Li_5P_3O_{10}$, and $Li_6P_4O_{13}$, and $P_2O_5$, and more preferably includes $Li_3PO_4$ and $P_2O_5$.

Specifically, the reaction step A is preferably a step of producing the crude product by the reaction of the following modes A1 to A4. Especially, it is more preferable that it is a step of producing the crude product by reaction of the mode A1.

$3LiPF_6+2P_2O_5+2Li_3PO_4\rightarrow 9LiPO_2F_2$ (Mode A1):

$2LiPF_6+P_2O_5+Li_4P_2O_7\rightarrow 6LiPO_2F_2$ (Mode A2):

$5LiPF_6+2P_2O_5+2Li_5P_3O_{10}\rightarrow 15LiPO_2F_2$ (Mode A3):

$3LiPF_6+P_2O_5+Li_6P_4O_{13}\rightarrow 9LiPO_2F_2$ (Mode A4):

In the reactions of the modes A1 to A4, one or more lithium salts of a phosphoric acid other than $Li_3PO_4$, one or more lithium salts of a phosphoric acid other than $Li_4P_2O_7$, one or more lithium salts of a phosphoric acid other than $Li_5P_3O_{10}$, and one or more lithium salts of a phosphoric acid other than $Li_6P_4O_{13}$ can be respectively reacted by adjusting the raw material molar ratio.

(Reaction Step B)

The reaction step B is a step of producing the crude product through the reaction of the above-described Mode 3.

In other words, the reaction step B is a step of producing the crude product by reacting lithium hexafluorophosphate ($LiPF_6$) with lithium metaphosphate ($LiPO_3$).

When the reaction step is reaction step B, "at least one selected from the group consisting of an oxide of phosphorus (A) and a lithium salt of a phosphoric acid (B)" in the step of obtaining the first raw material mixture preferably includes $LiPO_3$.

Specifically, the reaction step B is preferably a step of producing the crude product by the reaction of the following mode B.

$LiPF_6+2LiPO_3\rightarrow 3LiPO_2F_2$ (Mode B):

In the reaction step, the reaction when reacting $LiPF_6$ with at least one selected from the group consisting of an oxide of phosphorus (A) and a lithium salt of a phosphoric acid (B) is preferably a solid phase reaction. When the second raw material mixture is in a form of a wet cake, this solid phase reaction can be realized.

In the reaction step, the second raw material mixture is preferably heated and reacted in a sealed reaction system to a desired temperature condition.

In the reaction step, the second raw material mixture may be reacted while being mixed, for example, using a reactor equipped with a stirring mechanism.

The reaction in the reaction step may be carried out under normal pressure or under reduced pressure, but from the viewpoint of obtaining $LiPO_2F_2$ in a high yield, it is preferable to carry out in a sealed reaction system from the start of the reaction to the end.

When the above-described reaction is carried out in a sealed reaction system, the reaction may be conducted under an inert atmosphere such as nitrogen or argon or under reduced pressure in the reaction system.

When the above-described reaction is carried out in the sealed reaction system, the reaction may be carried out in a sealed system containing oxygen. For the sealed system containing oxygen, reference can be made to a reference mode described later.

In the reaction step, the temperature when reacting $LiPF_6$ with at least one selected from the group consisting of an oxide of phosphorus (A) and a lithium salt of a phosphoric acid (B) (hereinafter also referred to as "reaction temperature") is preferably from 100° C. to 350° C., more preferably from 150° C. to 300° C., and still more preferably from 180° C. to 250° C.

When the reaction temperature is 100° C. or higher, the reaction tends to proceed efficiently.

When the reaction temperature is 350° C. or lower, $LiPO_2F_2$ is difficult to be decomposed, and the formation of products (that is, by-products) other than $LiPO_2F_2$ which is a main product is easily suppressed.

In the reaction step, from the viewpoint of efficiently advancing the reaction, the time for reacting $LiPF_6$ with at least one selected from the group consisting of an oxide of phosphorus (A) and a lithium salt of a phosphoric acid (B) is preferably from 4 hours to 16 hours, more preferably from 5 hours to 14 hours, and still more preferably from 6 hours to 12 hours.

The production method of the present disclosure preferably includes a step of obtaining a solution by dissolving the above-described crude product in a purification solvent (hereinafter also referred to as "dissolution step") and a step of extracting lithium difluorophosphate from this solution (hereinafter also referred to as "extracting step").

When the production method of the present disclosure includes the dissolution step and the extracting step, the crude product ($LiPO_2F_2$ containing impurities) can be effectively purified, and $LiPO_2F_2$ with an increased purity can be extracted.

The dissolution step and the extracting step will be described below.

<Dissolution Step>

The above-described dissolution step is a step of obtaining a solution by dissolving a crude product in a purification solvent.

The purification solvent is not particularly limited as long as it can dissolve the crude product, and a mixed solvent of a good solvent for $LiPO_2F_2$ (hereinafter referred to as "solvent (X)") and a poor solvent for $LiPO_2F_2$ (hereinafter referred to as "solvent (Y)") is preferably used. Accordingly, $LiPO_2F_2$ is easily dissolved in the purification solvent, and $LiPO_2F_2$ can be easily extracted from the solution in which the crude product is dissolved.

Examples of the good solvent (solvent (X)) include ethyl acetate, acetone, dimethoxyethane, diethylene glycol dimethyl ether, triethylene glycol dimethyl ether and the like. A solvent (X) may be used singly, or in combination of two or more.

Examples of the poor solvent (solvent (Y)) include toluene, xylene, hexane, acetonitrile, dimethyl carbonate, ethyl methyl carbonate, diethyl carbonate and the like. The solvent (Y) may be used singly or in combination of two or more.

The mass ratio (solvent (X)/solvent (Y)) of the purification solvent (mixed solvent) is preferably from 70/30 to 95/5, more preferably from 75/25 to 95/5, still more preferably from 80/20 to 95/5, and particularly preferably from 85/15 to 95/5.

By setting the mass ratio of the purification solvent (solvent (X)/solvent (Y)) to 70/30 or more, $LiPO_2F_2$ is more easily dissolved in the purification solvent. On the other hand, it is considered that solubility of the solvent (Y) is low not only for $LiPO_2F_2$ but also for impurities contained in the crude product.

By setting the mass ratio of the purification solvent (solvent (X) and solvent (Y)) to 95/5 or less, dissolution of impurities in the purification solvent is easily suppressed.

Therefore, by setting the mass ratio of the purification solvent to the above-described range, $LiPO_2F_2$ can be easily extracted from the solution in which the crude product is dissolved. In other words, it is easy to extract high purity $LiPO_2F_2$ in a high yield.

In other words, the above-described purification solvent is preferably a mixed solvent in which at least one solvent (X) selected from the group consisting of ethyl acetate, acetone, dimethoxyethane, diethylene glycol dimethyl ether, and triethylene glycol dimethyl ether, and at least one solvent (Y) selected from the group consisting of toluene, xylene, hexane, acetonitrile, dimethyl carbonate, ethyl methyl carbonate, and diethyl carbonate, are mixed at a mass ratio (the solvent (X)/the solvent (Y)) in the range from 70/30 to 95/5.

When the purification solvent is a mixed solvent of solvent (X) and solvent (Y), the purification solvent is preferably a mixed solvent containing at least one of ethyl acetate or dimethoxyethane as the solvent (X) and at least one of toluene or dimethyl carbonate as the solvent (Y).

A combination of the solvent (X) and the solvent (Y) is preferably a combination of ethyl acetate and toluene, a combination of ethyl acetate and dimethyl carbonate, a combination of dimethoxyethane and toluene, or a combination of dimethoxyethane and dimethyl carbonate.

When dissolving the crude product in the purification solvent (preferably, a mixed solvent of solvent (X) and solvent (Y)) in the dissolution step, the crude product is preferably cooled to 60° C. or lower (preferably 50° C. or lower) and injected or circulated in the purification solvent. Accordingly, when $LiPO_2F_2$ is extracted in the extracting step described later, the purity of $LiPO_2F_2$ tends to increase.

The method of dissolving the crude product containing $LiPO_2F_2$ in a purification solvent is not particularly limited, and known methods (stirring method, ultrasonic irradiation method, and the like) can be used.

<Extracting Step>

The extracting step is a step of extracting $LiPO_2F_2$ from the solution obtained in the dissolution step.

There is no particular limitation on the method of extracting $LiPO_2F_2$ from the solution (the solution in which the crude product is dissolved in the purification solvent) obtained in the dissolution step, and the conventionally known methods can be arbitrarily selected and carried out. Examples of the method include: a method of heating and concentrating the solution and distilling off the purification solvent; a method of concentrating the solution under reduced pressure using an evaporator and distilling off the purification solvent; a method of filtering the solution (for example, filter filtration, filtration under reduced pressure, and suction filtration), a method of precipitating $LiPO_2F_2$ by further adding another purification solvent different from the purification solvent in which the crude product is dissolved to the solution, and the like. By the above-described method, $LiPO_2F_2$ as a solid can be extracted.

As a method drying $LiPO_2F_2$ extracted as a solid, conventionally known methods can be arbitrarily selected and implemented. For example, a stationary drying method in tray type dryer; a fluid drying method in conical dryer; method of drying using apparatus such as hot plate or oven; a method of supplying warm air or hot air with drying apparatus such as a dryer; and the like. Accordingly, removal of the residual solvent of extracted $LiPO_2F_2$ can be performed.

The method of producing $LiPO_2F_2$ of the present disclosure described above is particularly suitable for producing $LiPO_2F_2$ as an additive to be added to a non-aqueous electrolyte solution for a lithium ion battery (preferably a lithium ion secondary battery).

In other words, according to the production method of the present disclosure, since $LiPO_2F_2$ can be produced with a high yield, productivity of $LiPO_2F_2$ is improved.

The $LiPO_2F_2$ produced by the production method of the present disclosure is expected to contribute to the improvement of battery characteristics when added to the non-aqueous electrolyte solution.

[Reference Mode of Method of Producing Lithium Difluorophosphate]

The reference mode of the method of producing lithium difluorophosphate is shown below.

According to the reference mode, lithium difluorophosphate can be produced in a high yield.

The method of producing lithium difluorophosphate according to the reference mode includes the following modes <1A> to <9A>.

<1A> A method of producing lithium difluorophosphate, including a step of producing a crude product containing lithium difluorophosphate by reacting lithium hexafluorophosphate with at least one selected from the group consisting of an oxide of phosphorus (A) and a lithium salt of a phosphoric acid (B) in a sealed system containing oxygen.

<2A> The method of producing lithium difluorophosphate according to <1A>, wherein the step of producing the crude product is a step of producing the crude product according to the following reaction formula:

Reaction formula: $x(\text{LiPF}_6) + y(\text{oxide of phosphorus (A)}) + z(\text{lithium salt of phosphoric acid (B)}) \rightarrow n(\text{LiPO}_2\text{F}_2)$ wherein, in the above reaction formula, x, y, z, and n represent stoichiometric coefficients, each of x and n independently represents an integer of 1 or more, and each of y and z independently represents an integer of 0 or 1 or more, provided that, x, y, z, and n satisfy the following formulae (1) to (4):

Formula (1): $x + \text{number of Li atoms in the (B)} \times z = n;$

Formula (2): $x + \text{number of P atoms in the (A)} \times y + \text{number of P atoms in the (B)} \times z = n;$ Formula (3): $\text{number of O atoms in the (A)} \times y + \text{number of O atoms in the (B)} \times z = 2n;$ and Formula (4): $6x = 2n.$ <3A> The method of producing lithium difluorophosphate according to <1A> or <2A>, wherein the step of producing the crude product is a step of producing the crude product by reacting lithium hexafluorophosphate with at least one selected from the group consisting of lithium metaphosphate, trilithium phosphate, tetralithium pyrophosphate, pentalithium triphosphate, hexalithium tetraphosphate, and diphosphorus pentoxide.

<4A> The method of producing lithium difluorophosphate according to any one of <1A> to <3A>, wherein the step of producing the crude product is a step of producing the crude product by reacting lithium hexafluorophosphate with a compound containing one selected from the group consisting of trilithium phosphate, tetralithium pyrophosphate, pentalithium triphosphate, and hexalithium tetraphosphate, and diphosphorus pentoxide.

<5A> The method of producing lithium difluorophosphate according to any one of <1A> to <4A>, wherein the step of producing the crude product is a step of producing the crude product by reacting lithium hexafluorophosphate with trilithium phosphate and diphosphorus pentoxide.

<6A> The method of producing lithium difluorophosphate according to any one of <1A> to <3A>, wherein the step of producing the crude product is a step of producing the crude product by reacting lithium hexafluorophosphate with lithium metaphosphate.

<7A> The method of producing lithium difluorophosphate according to any one of <1A> to <6A>, further including:
a step of obtaining a solution by dissolving the crude product in a purification solvent; and
a step of extracting lithium difluorophosphate from the solution.

<8A> The method of producing lithium difluorophosphate according to <7A>, wherein the purification solvent is a mixed solvent in which at least one solvent (X) selected from the group consisting of ethyl acetate, acetone, dimethoxyethane, diethylene glycol dimethyl ether, and triethylene glycol dimethyl ether, and at least one solvent (Y) selected from the group consisting of toluene, xylene, hexane, acetonitrile, dimethyl carbonate, ethyl methyl carbonate, and diethyl carbonate, are mixed at a mass ratio (the solvent (X)/the solvent (Y)) in the range from 70/30 to 95/5.

<9A> The method of producing lithium difluorophosphate according to <7A> or <8A>, wherein the purification solvent is a mixed solvent containing at least one of ethyl acetate or dimethoxyethane as the solvent (X) and at least one of toluene or dimethyl carbonate as the solvent (Y).

<10A> The method of producing lithium difluorophosphate according to any one of <7A> to <9A>, wherein a combination of the solvent (X) and the solvent (Y) is a combination of ethyl acetate and toluene, a combination of ethyl acetate and dimethyl carbonate, a combination of dimethoxyethane and toluene, or a combination of dimethoxyethane and dimethyl carbonate.

The method of producing lithium difluorophosphate of the reference mode (hereinafter also referred to as "production method of the reference mode") includes a step of producing a crude product containing lithium difluorophosphate by reacting lithium hexafluorophosphate with at least one selected from the group consisting of an oxide of phosphorus (A) and a lithium salt of a phosphoric acid (B) in the sealed system containing oxygen (hereinafter also referred to as "reaction step").

Here, the sealed system means a sealed reaction system. Specifically, it refers to a system without substantial gas leakage out of the atmosphere in which the reaction takes place. Without substantial gas leakage means that the design may include unavoidable gas leakage.

According to the production method of the reference mode, $\text{LiPO}_2\text{F}_2$ can be manufactured in a high yield.

Although the reason why such an effect is exerted is not clear, it is considered to be because, in the above-described reaction step, the reaction proceeds efficiently by reacting $\text{LiPF}_6$ with at least one selected from the group consisting of an oxide of phosphorus (A) and a lithium salt of a phosphoric acid (B) in the sealed system containing oxygen.

In contrast, when the above-described reaction step is performed in a sealed system containing no oxygen or in an open system containing oxygen, the target reaction is likely to be inhibited.

Therefore, it is considered that, according to the production method of the reference mode, the reaction in the sealed system containing oxygen contributes to the improvement of the yield of $\text{LiPO}_2\text{F}_2$.

For example, when the above-described reaction step is a step of producing a crude product containing $\text{LiPO}_2\text{F}_2$ by reacting $\text{LiPF}_6$ with $\text{P}_2\text{O}_5$ as an oxide of phosphorus (A) and $\text{Li}_3\text{PO}_4$ as a lithium salt of a phosphoric acid (B), a crude product containing $\text{LiPO}_2\text{F}_2$ can be produced through the reaction 1 and reaction 2 described below.

In this case, volatilization of the $\text{POF}_3$ gas generated by the reaction 1 is suppressed by performing the reaction 1 and the reaction 2 in a sealed system containing oxygen. As a result, the $\text{POF}_3$ gas easily reacts with $\text{Li}_3\text{PO}_4$ and is easily converted to $\text{LiPO}_2\text{F}_2$. That is, it is considered that the reaction of reaction 2 proceeds efficiently.

Reaction 1: $3\text{LiPF}_6 + 2\text{P}_2\text{O}_5 \rightarrow 3\text{LiPO}_2\text{F}_2 + 4\text{POF}_3 \text{ (gas)}$ Reaction 2: $4\text{POF}_3 \text{ (gas)} + 2\text{Li}_3\text{PO}_4 \rightarrow 6\text{LiPO}_2\text{F}_2$ Hereinafter, each step of the production method of the reference mode is demonstrated.

<Reaction Step>

In the production method of the reference mode, the reaction step is a step of producing a crude product containing lithium difluorophosphate ($\text{LiPO}_2\text{F}_2$) by reacting lithium hexafluorophosphate ($\text{LiPF}_6$) with at least one selected from the group consisting of an oxide of phosphorus (A) and a lithium salt of a phosphoric acid (B) in a sealed system containing oxygen.

The reaction step in the production method of the reference mode is the same as the reaction step in the production method of the present disclosure except for being limited to reacting lithium hexafluorophosphate ($LiPF_6$) with at least one selected from the group consisting of an oxide of phosphorus (A) and a lithium salt of a phosphoric acid (B) in a sealed system containing oxygen, and a preferable mode is also the same.

Examples of the sealed system (sealed reaction system) in a reaction step include a sealable reaction vessel. The sealable reaction vessel is not particularly limited, but is preferably a reaction vessel which can stir so that the raw materials ($LiPF_6$ and at least one of oxide of phosphorus (A) or lithium salt of a phosphoric acid (B)) are sufficiently mixed.

Examples of the oxygen include, without specific limitation, air (dry air or the like), oxygen and air diluted with an inert gas (nitrogen, helium, argon, or the like).

The oxygen concentration in the sealed system is preferably from 3 volume percent to 50 volume percent, more preferably from 5 volume percent to 40 volume percent, and still more preferably from 8 volume percent to 30 volume percent.

When the oxygen concentration is 3 volume percent or more, consumption of $P_2O_5$ due to side reaction (for example, decomposition of $P_2O_5$ by water) is likely to be suppressed.

When the oxygen concentration is 50 volume percent or less, excessive oxidation of $LiPF_6$ is likely to be suppressed.

Therefore, when the oxygen concentration is from 3 volume percent to 50 volume percent, by-products in the reaction step are reduced, and $LiPO_2F_2$ is easily obtained in a high yield.

The production method of the reference mode preferably includes a step of obtaining a solution by dissolving the above-described crude product in a purification solvent (hereinafter also referred to as "dissolution step") and a step of extracting lithium difluorophosphate from this solution (hereinafter also referred to as "extracting step").

When the production method of the present disclosure includes the dissolution step and the extracting step, the crude product ($LiPO_2F_2$ containing impurities) can be effectively purified, and $LiPO_2F_2$ with an increased purity can be extracted.

The dissolution step and the extracting step which may be included in the production method of the reference mode are respectively the same as the dissolution step and the extracting step which may be included in the production method of the present disclosure, and the preferred embodiments are also the same.

The production method of the reference mode is also particularly suitable for producing $LiPO_2F_2$ as an additive to be added to a non-aqueous electrolyte solution for a lithium ion battery (preferably a lithium ion secondary battery).

In other words, according to the production method of the reference mode, since $LiPO_2F_2$ can be produced with a high yield, productivity of $LiPO_2F_2$ is improved.

The $LiPO_2F_2$ produced by the production method of the reference mode is expected to contribute to the improvement of battery characteristics when added to the non-aqueous electrolyte solution.

EXAMPLES

Examples of the present disclosure will be shown below, but the present disclosure is not limited to the following examples.

In the following, "%" refers to "% by mass" unless otherwise noted.

Example 1

A crude product containing $LiPO_2F_2$ was prepared in the following manner.

In a glove box purged with dry nitrogen gas, respective powders of 5.0 g of lithium hexafluorophosphate, 3.1 g of diphosphorus pentoxide, and 2.5 g of trilithium phosphate as raw materials, and 100 mL of tetralin as a raw material mixed medium were put into a beaker of 200 mL together with a stirring bar of a magnetic stirrer, and were stirred and mixed at 300 rpm for one hour (the step of obtaining the first raw material mixture) by the stirrer.

Subsequently, the mixed slurry liquid was filtered to remove at least a part of the raw material mixed medium (tetralin) so that a wet cake of raw material powder was obtained (the step of obtaining the second raw material mixture).

Next, a 200 mL Hastelloy C sealed reaction vessel (hereinafter, also simply referred to as a "reaction vessel") equipped with a thermometer, a pressure gauge, and gas introduction and exhaust lines is placed in the same glove box, the wet cake of the raw material powder mixed in advance was put in the reaction vessel together with a stirring bar, covered with a lid, and sealed. The reaction vessel was taken out of the glove box, heated, and reacted at a temperature of 200° C. for 8 hours (the reaction step).

Next, the reaction vessel was cooled to room temperature (25° C.), the inside of the reaction vessel was purged with nitrogen gas, and then the reaction vessel was again put into a glove box purged with dry nitrogen gas, and the lid of the reaction vessel was opened. 150 g of a purification solvent (ethyl acetate/toluene (mass ratio)=95/5) prepared in advance by mixing ethyl acetate as a solvent (X) and toluene as a solvent (Y) was added thereinto, then, the reaction vessel was covered with the lid and was taken out of the glove box, heated to 60° C. and stirred at 300 rpm for 1 hour, so that a solution in which the crude product was dissolved was obtained (the dissolution step).

After that, the lid of the reaction vessel was opened immediately, the solution in the reaction vessel (solution in which the crude product was dissolved) was poured into a filter unit equipped with a filter to filter out solvent insoluble solid (impurities) by filtration under reduced pressure, and then the solution was collected. The collected solution was subjected to solvent removal by an evaporator and thus was concentrated, then the operation was stopped at a timing when the solvent was removed by approximately 100 g, the obtained slurry liquid was filtered at a room temperature (25° C.), and consequently, a wet cake containing LiPO$_2$F$_2$ was obtained (the extracting step). Then, it was dried under reduced pressure at 50° C. and 1000 Pa or less, and a solid having a weight of 9.4 g after drying was obtained.

As a result of analysis of the obtained solid to determine the purity, 99.9% of lithium difluorophosphate (LiPO$_2$F$_2$) and 0.1% of the other components were identified. The yield was 88.2% (see Table 1).

The purity and yield of LiPO$_2$F$_2$ were determined as follows.

(Purity of LiPO$_2$F$_2$)

The obtained solid was dissolved in a heavy water solvent. $^{19}$F-NMR analysis was conducted, and the purity of LiPO$_2$F$_2$ was calculated by the percentage method on a mass basis based on the integral value of the obtained spectrum.

The assignment of the $^{19}$F-NMR spectrum was as follows.

LiPF$_6$: −71.4 ppm, −73.3 ppm (molecular weight: 151.9, F number: 6)

Li$_2$PO$_3$F: −75.0 ppm, −77.5 ppm (molecular weight: 111.9, F number: 1)

LiPO$_2$F$_2$: −81.0 ppm, −83.5 ppm (molecular weight: 107.9, F number: 2)

LiF: −120.0 ppm (molecular weight: 25.9, F number: 1)

Other components: other peaks (molecular weight and F number were assumed to be the same as LiPF$_6$)

From the spectrum obtained by the analysis, the mass fraction of each compound was determined by the above-described assignment and the following formula, and the mass fraction of LiPO$_2$F$_2$ was taken as the purity.

(Integral value/F number of compound)×(molecular weight of compound)=(mass part of compound)

(Mass part of compound)/(sum of mass parts of compounds)×100=mass fraction of compound (%)

(Yield of LiPO$_2$F$_2$)

The mass of LiPO$_2$F$_2$ was determined by multiplying the mass of the obtained solid by the purity calculated above. From this mass, the number of moles of F atoms contained in LiPO$_2$F$_2$ was calculated, and the result was defined as the number of moles 1. Next, from the mass of LiPF$_6$ as a raw material, the number of moles of F atom contained in this LiPF$_6$ was calculated, and the result was defined as the number of moles 2. The yield of LiPO$_2$F$_2$ was determined as the ratio of the number of moles 1 to the number of moles 2 ((number of moles 1/number of moles 2)×100). In other words, the yield of LiPO$_2$F$_2$ was taken as the yield based on F atoms.

Examples 2 to 16

According to Table 1, a solid was obtained in the same manner as in Example 1 except that the combination of the types of the raw material mixed medium and the purification solvent was changed, and the same measurement as in Example 1 was performed. The results are shown in Table 1. In Table 1, "wt ratio" represents a mass ratio. Table 2 is also the same.

Comparative Example 11

A crude product containing LiPO$_2$F$_2$ was prepared in the following manner.

A 200 mL Hastelloy C sealed reaction vessel equipped with a thermometer, pressure gauge, and gas introduction and exhaust lines was placed into a dry nitrogen gas purged glove box. In the glove box, respective powders of 5.0 g of lithium hexafluorophosphate, 3.1 g of diphosphorus pentoxide, and 2.5 g of trilithium phosphate were placed in the reaction vessel together with a stirring bar of a magnetic stirrer, covered with a lid, and sealed. The reaction vessel was taken out of the glove box, and stirred and mixed at 300 rpm for 1 hour with the stirrer.

Next, the reaction vessel in which the raw materials had been charged and mixed was heated, and the reaction was carried out by treatment at 200° C. for 8 hours to obtain a crude product containing LiPO$_2$F$_2$.

Next, the reaction vessel was cooled to room temperature (25° C.), the inside of the reaction vessel was purged with nitrogen gas, and then the reaction vessel was again put into a glove box purged with dry nitrogen gas, and the lid of the reaction vessel was opened. 150 g of a purification solvent (ethyl acetate/toluene (mass ratio)=95/5) prepared in advance by mixing ethyl acetate as a solvent (X) and toluene as a solvent (Y) was added thereinto, then, the reaction vessel was covered with the lid and was taken out of the glove box, and stirred at 300 rpm for one hour with a stirrer while heating to 60° C. to obtain a solution in which the crude product was dissolved.

After that, the lid of the reaction vessel was opened immediately, the solution in the reaction vessel (solution in which the crude product was dissolved) was poured into a filter unit equipped with a filter to filter out solvent insoluble solid (impurities) by filtration under reduced pressure and then the solution was collected. The collected solution was subjected to solvent removal with an evaporator and thus was concentrated, then the operation was stopped at a timing when the solvent was removed by approximately 100 g, the obtained slurry liquid was filtered at a room temperature (25° C.), and consequently, a wet cake containing LiPO$_2$F$_2$ was obtained. Then, it was dried under reduced pressure at 50° C. and 1000 Pa or less, and a solid having a mass of 8.6 g after drying was obtained.

As a result of analysis of the obtained solid to determine the purity, 99.9% of lithium difluorophosphate (LiPO$_2$F$_2$) and 0.1% of the other components were identified. The yield was 80.7% (see Table 2).

Comparative Examples 2 to 4

According to Table 2, a solid was obtained in the same manner as in Comparative Example 1 except that the combination of the types of the purification solvent was changed, and the same measurement as in Comparative Example 1 was performed. The results are shown in Table 2.

Comparative Examples 5 to 7

According to Table 2, a solid was obtained in the same manner as in Example 1 except that the raw material mixed medium was changed, and the same measurement as in Example 1 was performed. The results are shown in Table 2.

TABLE 1

| | Reaction Raw Material (g/mol) | | | Raw Material Mixed Medium | Reaction Conditions | | Purification Solvent Composition (wt ratio) | | yield amount (g) | yield (%) F atom yield | Purity (%) [$^{19}$F-NMR] | | | |
|---|---|---|---|---|---|---|---|---|---|---|---|---|---|---|
| | LiPF$_6$ | P$_2$O$_5$ | Li$_3$PO$_4$ | | temperature (°C.) | time (h) | solvent (X) | solvent (Y) | | | LiPO$_2$F$_2$ | Li$_2$PO$_3$F | LiF | others |
| Example 1 | 5.0/ 0.033 | 3.1/ 0.022 | 2.5/ 0.022 | tetralin | 200 | 8 | ethyl acetate 95 | toluene 5 | 9.4 | 88.2 | 99.9 | 0 | 0 | 0.1 |
| Example 2 | | | | | | | ethyl acetate 95 | dimethyl carbonate 5 | 9.5 | 89.2 | 99.9 | 0 | 0 | 0.1 |
| Example 3 | | | | | | | dimethoxy ethane 95 | toluene 5 | 9.3 | 87.3 | 99.9 | 0 | 0 | 0.1 |
| Example 4 | | | | | | | dimethoxy ethane 95 | dimethyl carbonate 5 | 9.3 | 87.3 | 99.9 | 0 | 0 | 0.1 |
| Example 5 | | | | toluene | | | ethyl acetate 95 | toluene 5 | 9.4 | 88.2 | 99.9 | 0 | 0 | 0.1 |
| Example 6 | | | | | | | ethyl acetate 95 | dimethyl carbonate 5 | 9.5 | 89.2 | 99.9 | 0 | 0 | 0.1 |
| Example 7 | | | | | | | dimethoxy ethane 95 | toluene 5 | 9.3 | 87.3 | 99.9 | 0 | 0 | 0.1 |
| Example 8 | | | | | | | dimethoxy ethane 95 | dimethyl carbonate 5 | 9.2 | 86.3 | 99.9 | 0 | 0 | 0.1 |
| Example 9 | | | | hexane | | | ethyl acetate 95 | toluene 5 | 9.3 | 87.3 | 99.9 | 0 | 0 | 0.1 |
| Example 10 | | | | | | | ethyl acetate 95 | dimethyl carbonate 5 | 9.2 | 86.3 | 99.9 | 0 | 0 | 0.1 |
| Example 11 | | | | | | | dimethoxy ethane 95 | toluene 5 | 9.2 | 86.3 | 99.9 | 0 | 0 | 0.1 |
| Example 12 | | | | | | | dimethoxy ethane 95 | dimethyl carbonate 5 | 9.0 | 84.5 | 99.9 | 0 | 0 | 0.1 |
| Example 13 | | | | cyclo hexane | | | ethyl acetate 95 | toluene 5 | 9.2 | 86.3 | 99.9 | 0 | 0 | 0.1 |
| Example 14 | | | | | | | ethyl acetate 95 | dimethyl carbonate 5 | 9.2 | 86.3 | 99.9 | 0 | 0 | 0.1 |
| Example 15 | | | | | | | dimethoxy ethane 95 | toluene 5 | 9.3 | 87.3 | 99.9 | 0 | 0 | 0.1 |
| Example 16 | | | | | | | dimethoxy ethane 95 | dimethyl carbonate 5 | 9.0 | 84.5 | 99.9 | 0 | 0 | 0.1 |

TABLE 2

| | Reaction Raw Material (g/mol) | | | Raw Material Mixed Medium | Reaction Conditions | | Purification Solvent Composition (wt ratio) | |
|---|---|---|---|---|---|---|---|---|
| | LiPF$_6$ | P$_2$O$_5$ | Li$_3$PO$_4$ | | temperature (°C.) | time (h) | solvent (X) | solvent (Y) |
| Comparative Example 1 | 5.0/ 0.033 | 3.1/ 0.022 | 2.5/ 0.022 | nil (powder mixture) | 200 | 8 | ethyl acetate 95 | toluene 5 |
| Comparative Example 2 | | | | | | | ethyl acetate 95 | dimethyl carbonate 5 |
| Comparative Example 3 | | | | | | | dimethoxyethane 95 | toluene 5 |
| Comparative Example 4 | | | | | | | dimethoxyethane 95 | dimethyl carbonate 5 |
| Comparative Example 5 | | | | acetone | | | ethyl acetate 95 | toluene 5 |
| Comparative Example 6 | | | | triethylene glycol dimethyl ether | | | ethyl acetate 95 | toluene 5 |
| Comparative Example 7 | | | | acetonitrile | | | ethyl acetate 95 | toluene 5 |

TABLE 2-continued

|  | yield amount (g) | yield (%) F atom yield | Purity (%) [$^{19}$F-NMR] | | | |
| --- | --- | --- | --- | --- | --- | --- |
|  |  |  | LiPO$_2$F$_2$ | Li$_2$PO$_3$F | LiF | others |
| Comparative Example 1 | 8.6 | 80.7 | 99.9 | 0 | 0 | 0.1 |
| Comparative Example 2 | 8.7 | 81.7 | 99.9 | 0 | 0 | 0.1 |
| Comparative Example 3 | 8.1 | 76.0 | 99.9 | 0 | 0 | 0.1 |
| Comparative Example 4 | 8.2 | 77.0 | 99.9 | 0 | 0 | 0.1 |
| Comparative Example 5 | 7.5 | 69.9 | 99.3 | 0.5 | 0 | 0.2 |
| Comparative Example 6 | 4.3 | 38.9 | 96.4 | 2.7 | 0.1 | 0.8 |
| Comparative Example 7 | 6.6 | 60.0 | 97.0 | 2.1 | 0 | 0.9 |

As shown in Tables 1 and 2, it is found that each of the Examples in which the raw material powder was mixed using a hydrocarbon solvent having from 6 to 12 carbon atoms (raw material mixed medium) achieves LiPO$_2$F$_2$ in a high yield compared with Comparative Examples 1 to 4 in which only the raw material powder was mixed, and Comparative Examples 5 to 7 in which the raw material powder was mixed using a solvent other than the above-described hydrocarbon solvent (acetone, triethylene glycol dimethyl ether or acetonitrile). Moreover, the purity of LiPO$_2$F$_2$ obtained in each Example was also high.

Hereinafter, the specific example of the above-mentioned reference mode is shown as a "Reference Example", and Comparative Example with respect to a Reference Example is shown as a "Reference Comparative Example."

Reference Example 1

A crude product containing LiPO$_2$F$_2$ was prepared in the following manner.

A 200 mL Hastelloy C sealed reaction vessel (hereinafter, also referred to simply as "reaction vessel") equipped with a thermometer, pressure gauge, and gas introduction and exhaust lines was placed into a dry nitrogen gas purged glove box. In the glove box, respective powders of 5.0 g of lithium hexafluorophosphate, 3.1 g of diphosphorus pentoxide, and 2.5 g of trilithium phosphate as the raw materials were placed in the reaction vessel together with a stirring bar of a magnetic stirrer, covered with a lid, and sealed. The reaction vessel was taken out of the glove box, and stirred and mixed at 300 rpm for 1 hour with a stirrer.

Next, an operation was repeated twice in which an exhaust line of the reaction vessel in which the raw materials had been charged and mixed was opened, the reaction vessel was depressurized to 1000 Pa or less, dry air was introduced from the gas introduction line, and the inside of the reaction vessel was replaced with dry air. Next, the exhaust line was closed, the reaction vessel was sealed, heating was started, and reaction was carried out by treatment at 200° C. for 8 hours (the reaction step).

Next, the reaction vessel was cooled to room temperature (25° C.), the inside of the reaction vessel was purged with nitrogen gas, and then the reaction vessel was again put into a glove box purged with dry nitrogen gas, and the lid of the reaction vessel was opened. 150 g of a purification solvent (ethyl acetate/toluene (mass ratio)=95/5) prepared in advance by mixing ethyl acetate as a solvent (X) and toluene as a solvent (Y) was added thereinto, then, the reaction vessel was covered with the lid and was taken out of the glove box, and stirred by the stirrer at 300 rpm for 1 hour while heating to 60° C., so that a solution in which the crude product was dissolved was obtained (the dissolution step).

After that, the lid of the reaction vessel was opened immediately, the solution in the reaction vessel (solution in which the crude product was dissolved) was poured into a filter unit equipped with a filter to filter out solvent insoluble solid (impurities) by filtration under reduced pressure and then the solution was collected. The collected solution was subjected to solvent removal by an evaporator and thus was concentrated, then the operation was stopped at a timing when the solvent was removed by approximately 100 g, the obtained slurry liquid was filtered at a room temperature (25° C.), and consequently, a wet cake containing LiPO$_2$F$_2$ was obtained (the extracting step). Then, it was dried under reduced pressure at 50° C. and 1000 Pa or less, and a solid having a mass of 9.4 g after drying was obtained.

As a result of analysis of the obtained solid to determine the purity, 99.9% of lithium difluorophosphate (LiPO$_2$F$_2$) and 0.1% of the other components were identified. The yield was 88.2% (see Table 1).

The purity and yield of LiPO$_2$F$_2$ were determined as follows.

(Purity of LiPO$_2$F$_2$)

The obtained solid was dissolved in a heavy water solvent, $^{19}$F-NMR analysis was conducted, and the purity of LiPO$_2$F$_2$ was calculated by the percentage method on a mass basis based on the integral value of the obtained spectrum.

The assignment of the $^{19}$F-NMR spectrum was as follows.

LiPF$_6$: −71.4 ppm, −73.3 ppm (molecular weight: 151.9, F number: 6)

Li$_2$PO$_3$F: −75.0 ppm, −77.5 ppm (molecular weight: 111.9, F number: 1)

LiPO$_2$F$_2$: −81.0 ppm, −83.5 ppm (molecular weight: 107.9, F number: 2)

LiF: −120.0 ppm (molecular weight: 25.9, F number: 1)

Other components: other peaks (molecular weight and F number were assumed to be the same as LiPF$_6$)

From the spectrum obtained by the analysis, the mass fraction of each compound was determined by the above-described assignment and the following formula, and the mass fraction of LiPO$_2$F$_2$ was taken as the purity.

(Integral value/F number of compound)×(molecular weight of compound)=(mass part of compound)

(Mass part of compound)/(sum of mass parts of compounds)×100=mass fraction of compound (%)

(Yield of $LiPO_2F_2$)

The mass of $LiPO_2F_2$ was determined by multiplying the mass of the obtained solid by the purity calculated above. From this mass, the number of moles of F atoms contained in $LiPO_2F_2$ was calculated, and the result was defined as the number of moles 1. Next, from the mass of $LiPF_6$ as a raw material, the number of moles of F atom contained in this $LiPF_6$ was calculated, and the result was defined as the number of moles 2. The yield of $LiPO_2F_2$ was determined as the ratio of the number of moles 1 to the number of moles 2 ((number of moles 1/number of moles 2)×100). In other words, the yield of $LiPO_2F_2$ was taken as the yield based on F atoms.

Reference Example 2 to Reference Example 4

According to Table 3, a solid was obtained in the same manner as in Reference Example 1 except that the combination of the types of the purification solvent was changed, and the same measurement as in Reference Example 1 was performed. The results are shown in Table 3.

Reference Comparative Example 1

A solid was obtained in the same manner as in Reference Example 1 except that nitrogen was introduced from the gas introduction line in the reaction step of Reference Example 1, and the same measurement as in Reference Example 1 was performed. The results are shown in Table 3.

Reference Comparative Examples 2 to 4

According to Table 3, a solid was obtained in the same manner as in Reference Comparative Example 1 except that the combination of the types of the purification solvent was changed, and the same measurement as in Reference Comparative Example 1 was performed. The results are shown in Table 3.

TABLE 3

| | Reaction Raw Material (g/mol) | | | Atmosphere in reaction system | $O_2$ concentration in reaction system (vol %) | Reaction Conditions | | Purification Solvent Composition (wt ratio) | |
|---|---|---|---|---|---|---|---|---|---|
| | $LiPF_6$ | $P_2O_5$ | $Li_3PO_4$ | | | temperature (°C.) | time (h) | solvent (X) | solvent (Y) |
| Reference Example 1 | 5.0/ 0.033 | 3.1/ 0.022 | 2.5/ 0.022 | dried air | 21 | 200 | 8 | ethyl acetate 95 | toluene 5 |
| Reference Example 2 | | | | | 21 | | | ethyl acetate 95 | dimethyl carbonate 5 |
| Reference Example 3 | | | | | 21 | | | dimethoxy ethane 95 | toluene 5 |
| Reference Example 4 | | | | | 21 | | | dimethoxy ethane 95 | dimethyl carbonate 5 |
| Reference Comparative Example 1 | | | | nitrogen | 0 | | | ethyl acetate 95 | toluene 5 |
| Reference Comparative Example 2 | | | | | 0 | | | ethyl acetate 95 | dimethyl carbonate 5 |
| Reference Comparative Example 3 | | | | | 0 | | | dimethoxy ethane 95 | toluene 5 |
| Reference Comparative Example 4 | | | | | 0 | | | dimethoxy ethane 95 | dimethyl carbonate 5 |

| | yield amount (g) | yield (%) F atom yield | Purity (%) [$^{19}$F-NMR] | | | |
|---|---|---|---|---|---|---|
| | | | $LiPO_2F_2$ | $Li_2PO_3F$ | LiF | others |
| Reference Example 1 | 9.4 | 88.2 | 99.9 | 0 | 0 | 0.1 |
| Reference Example 2 | 9.2 | 86.3 | 99.9 | 0 | 0 | 0.1 |
| Reference Example 3 | 9.4 | 88.2 | 99.9 | 0 | 0 | 0.1 |
| Reference Example 4 | 9.2 | 86.3 | 99.9 | 0 | 0 | 0.1 |
| Reference Comparative Example 1 | 8.6 | 80.7 | 99.9 | 0 | 0 | 0.1 |
| Reference Comparative Example 2 | 8.7 | 81.7 | 99.9 | 0 | 0 | 0.1 |

TABLE 3-continued

| | | | | | | |
|---|---|---|---|---|---|---|
| Reference Comparative Example 3 | 8.1 | 76.0 | 99.9 | 0 | 0 | 0.1 |
| Reference Comparative Example 4 | 8.2 | 77.0 | 99.9 | 0 | 0 | 0.1 |

—Description of Table 3—

"wt ratio" represents a mass ratio.

"vol %" represents volume percent.

The "reaction system" is a reaction vessel which is an example of a sealed system containing oxygen.

As shown in Table 3, it is found that, in the reaction step, when reacting $LiPF_6$ with $P_2O_5$ (oxide of phosphorus (A)) and $Li_3PO_4$ (lithium salt of phosphoric acid (B)), $LiPO_2F_2$ was obtained with a higher yield in each Reference Example in which the reaction was performed in the sealed system (reaction vessel) containing oxygen, compared with each Reference Comparative Example in which the reaction was performed in the sealed system of a nitrogen atmosphere. In addition, the obtained $LiPO_2F_2$ was also high in purity.

The disclosures of Japanese Patent Application No. 2017-015855 and Japanese Patent Application No. 2017-015856 are incorporated herein by reference in their entirety.

All documents, patent applications, and technical standards described in this specification are incorporated herein by reference to the same extent as if each individual document, patent application, or technical standard was specifically and individually indicated to be incorporated by reference.

The invention claimed is:

1. A method of producing lithium difluorophosphate, the method comprising:
    obtaining a first raw material mixture by mixing lithium hexafluorophosphate, at least one selected from the group consisting of an oxide of phosphorus (A) and a lithium salt of a phosphoric acid (B), and at least one hydrocarbon solvent selected from the group consisting of tetralin, toluene, hexane and cyclohexane, a content of the hydrocarbon solvent contained in the first raw material mixture being 50% by mass or more with respect to an entirety of the first raw material mixture;
    obtaining a second raw material mixture in a form of a wet cake by removing at least a part of the hydrocarbon solvent contained in the obtained first raw material mixture; and
    producing a crude product containing lithium difluorophosphate by reacting the second raw material mixture at a temperature of from 100° C. to 350° C.

2. The A method of producing lithium difluorophosphate, the method comprising:
    obtaining a first raw material mixture by mixing lithium hexafluorophosphate, at least one selected from the group consisting of an oxide of phosphorus (A) and a lithium salt of a phosphoric acid (B), and at least one hydrocarbon solvent selected from the group consisting of tetralin, toluene, hexane and cyclohexane, a content of the hydrocarbon solvent contained in the first raw material mixture being 50% by mass or more with respect to an entirety of the first raw material mixture;
    obtaining a second raw material mixture in a form of a wet cake by removing at least a part of the hydrocarbon solvent contained in the obtained first raw material mixture; and
    producing a crude product containing lithium difluorophosphate by reacting the second raw material mixture at a temperature of from 100° C. to 350° C., wherein producing the crude product includes producing the crude product by reacting lithium hexafluorophosphate with at least one selected from the group consisting of an oxide of phosphorus (A) and a lithium salt of a phosphoric acid (B) according to the following reaction formula:
    Reaction formula: $x(LiPF_6)+y$(oxide of phosphorus (A))+ $z$(lithium salt of phosphoric acid (B)) $n(LiPO_2F_2)$
    wherein, in the reaction formula, x, y, z, and n represent stoichiometric coefficients, each of x and n independently represents an integer of 1 or more, and each of y and z independently represents an integer of 0 or 1 or more, provided that, x, y, z, and n satisfy the following formulae (1) to (4):

$$x + \text{number of Li atoms in (B)} \times z = n; \qquad \text{Formula (1):}$$

$$x + \text{number of P atoms in (A)} \times y + \text{number of P atoms in (B)} \times z = n; \qquad \text{Formula (2):}$$

$$\text{number of O atoms in (A)} \times y + \text{number of O atoms in (B)} \times z = 2n; \text{ and} \qquad \text{Formula (3):}$$

$$6x = 2n. \qquad \text{Formula (4):}$$

3. The method of producing lithium difluorophosphate according to claim 1, wherein producing the crude product includes producing the crude product by reacting lithium hexafluorophosphate with at least one selected from the group consisting of lithium metaphosphate, trilithium phosphate, tetralithium pyrophosphate, pentalithium triphosphate, hexalithium tetraphosphate, and diphosphorus pentoxide.

4. The method of producing lithium difluorophosphate according to claim 1, wherein producing the crude product includes producing the crude product by reacting lithium hexafluorophosphate with a compound containing one selected from the group consisting of trilithium phosphate, tetralithium pyrophosphate, pentalithium triphosphate, and hexalithium tetraphosphate, and diphosphorus pentoxide.

5. The method of producing lithium difluorophosphate according to claim 1, wherein producing the crude product includes producing the crude product by reacting lithium hexafluorophosphate with trilithium phosphate and diphosphorus pentoxide.

6. The method of producing lithium difluorophosphate according to claim 1, wherein producing the crude product includes producing the crude product by reacting lithium hexafluorophosphate with lithium metaphosphate.

7. The method of producing lithium difluorophosphate according to claim 1, further comprising:
    obtaining a solution by dissolving the crude product in a purification solvent; and
    extracting lithium difluorophosphate from the solution.

8. The method of producing lithium difluorophosphate according to claim 7, wherein the purification solvent is a mixed solvent in which at least one solvent (X) selected from the group consisting of ethyl acetate, acetone, dimethoxyethane, diethylene glycol dimethyl ether, and triethylene glycol dimethyl ether, and at least one solvent (Y) selected from the group consisting of toluene, xylene, hexane, acetonitrile, dimethyl carbonate, ethyl methyl carbonate, and diethyl carbonate, are mixed at a mass ratio (the solvent (X)/the solvent (Y)) in a range from 70/30 to 95/5.

9. The method of producing lithium difluorophosphate according to claim 8, wherein the purification solvent is a mixed solvent containing at least one of ethyl acetate or dimethoxyethane as the solvent (X) and at least one of toluene or dimethyl carbonate as the solvent (Y).

10. The method of producing lithium difluorophosphate according to claim 8, wherein a combination of the solvent (X) and the solvent (Y) is a combination of ethyl acetate and toluene, a combination of ethyl acetate and dimethyl carbonate, a combination of dimethoxyethane and toluene, or a combination of dimethoxyethane and dimethyl carbonate.

11. A method of producing lithium difluorophosphate, the method comprising:
- obtaining a first raw material mixture by mixing lithium hexafluorophosphate, at least one selected from the group consisting of an oxide of phosphorus (A) and a lithium salt of a phosphoric acid (B), and a hydrocarbon solvent having from 6 to 12 carbon atoms, a content of the hydrocarbon solvent contained in the first raw material mixture being 50% by mass or more with respect to an entirety of the first raw material mixture;
- obtaining a second raw material mixture in a form of a wet cake by removing at least a part of the hydrocarbon solvent contained in the obtained first raw material mixture;
- producing a crude product containing lithium difluorophosphate by reacting the second raw material mixture at a temperature of from 100° C. to 350° C.;
- obtaining a solution by dissolving the crude product in a purification solvent; and
- extracting lithium difluorophosphate from the solution.

* * * * *